United States Patent
Jang et al.

(10) Patent No.: US 11,535,263 B2
(45) Date of Patent: Dec. 27, 2022

(54) APPARATUS AND METHOD FOR PREDICTING MOVEMENT OF USER OF VEHICLE

(71) Applicants: HYUNDAI MOTOR COMPANY, Seoul (KR); KIA MOTORS CORPORATION, Seoul (KR)

(72) Inventors: Jae Myeong Jang, Yongin-si (KR); Se Kyung Choi, Gyeonggi-do (KR); Min Seok Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 231 days.

(21) Appl. No.: 16/654,338

(22) Filed: Oct. 16, 2019

(65) Prior Publication Data
US 2021/0001869 A1 Jan. 7, 2021

(30) Foreign Application Priority Data
Jul. 2, 2019 (KR) .......................... 10-2019-0079510

(51) Int. Cl.
*B60W 50/00* (2006.01)
*B60W 30/18* (2012.01)
(Continued)

(52) U.S. Cl.
CPC ........ *B60W 50/0097* (2013.01); *B60W 10/18* (2013.01); *B60W 10/20* (2013.01);
(Continued)

(58) Field of Classification Search
CPC ............. B60W 50/0097; B60W 30/18; B60W 10/18; B60W 10/20; B60W 2520/125;
(Continued)

(56) References Cited

U.S. PATENT DOCUMENTS

| 6,485,057 | B1* | 11/2002 | Midorikawa | ..... B60R 21/01546 280/801.1 |
| 2006/0076828 | A1* | 4/2006 | Lu | ........................ B62D 15/027 303/146 |
| 2006/0253240 | A1* | 11/2006 | Rao | ...................... B60W 50/035 701/1 |
| 2008/0147277 | A1* | 6/2008 | Lu | ...................... B60W 30/085 701/45 |
| 2008/0243327 | A1* | 10/2008 | Bujak | .................. B60W 30/12 340/442 |
| 2008/0243343 | A1* | 10/2008 | Kumagai | ............ B60R 21/0134 701/45 |

(Continued)

FOREIGN PATENT DOCUMENTS

JP 3575475 B2 * 10/2004 ......... B60R 21/0132

*Primary Examiner* — Jonathan M Dager
*Assistant Examiner* — Jean W Charleston
(74) *Attorney, Agent, or Firm* — Morgan, Lewis & Bockius LLP

(57) ABSTRACT

Disclosed herein is an apparatus for predicting movement of a user of a vehicle. The apparatus may include an acceleration sensor that senses an acceleration of the vehicle, a braking controller that automatically controls a deceleration of the vehicle, a steering controller that automatically controls a direction of the vehicle, and a control circuit electrically connected to the acceleration sensor, the braking controller, and the steering controller, where the control circuit may monitor an operation of the braking controller, and predict a movement of the user of the vehicle based on a longitudinal acceleration of the vehicle sensed by the acceleration sensor and a first predetermined parameter when braking by the braking controller is detected.

15 Claims, 10 Drawing Sheets

(51) Int. Cl.
*B60W 10/18* (2012.01)
*B60W 10/20* (2006.01)

(52) U.S. Cl.
CPC ......... *B60W 30/18* (2013.01); *B60W 2510/20* (2013.01); *B60W 2520/105* (2013.01); *B60W 2520/125* (2013.01); *B60W 2710/18* (2013.01); *B60W 2710/20* (2013.01)

(58) Field of Classification Search
CPC ....... B60W 2710/20; B60W 2520/105; B60W 2510/20; B60W 2710/18; B60W 2540/18; B60W 2540/12; B60W 40/08; B60R 21/01552; B60R 21/01512
USPC .......................................................... 701/41
See application file for complete search history.

(56) References Cited

U.S. PATENT DOCUMENTS

| | | | |
|---|---|---|---|
| 2009/0326761 A1* | 12/2009 | Nitta | B62D 6/001 701/41 |
| 2010/0023226 A1* | 1/2010 | Ito | B60R 21/0134 701/46 |
| 2010/0324774 A1* | 12/2010 | Bouni | B60R 21/0152 701/31.4 |
| 2013/0179015 A1* | 7/2013 | Liang | B60W 30/02 701/22 |
| 2016/0023655 A1* | 1/2016 | Makino | B62D 7/159 701/37 |
| 2017/0015315 A1* | 1/2017 | Hattori | B60R 21/0132 |
| 2017/0088129 A1* | 3/2017 | Iwasaki | B60W 10/06 |
| 2018/0141556 A1* | 5/2018 | Goh | B60W 10/18 |

* cited by examiner

APPARATUS AND METHOD FOR PREDICTING MOVEMENT OF USER OF VEHICLE

CROSS-REFERENCE TO RELATED APPLICATION

The present application claims priority to and the benefit of priority to Korean Patent Application No. 10-2019-0079510, filed in the Korean Intellectual Property Office on Jul. 2, 2019, the entire contents of which are incorporated herein by reference.

FIELD

The present disclosure relates to an apparatus and a method for predicting a movement of a user due to an operation of an in-vehicle system.

BACKGROUND

The statements in this section merely provide background information related to the present disclosure and may not constitute prior art.

With the development of the automotive industry, an autonomous driving system and a driving assistance system which enables partial autonomous driving have been developed. The driving assistance system may provide a variety of functions, such as a speed control function, an inter-vehicle distance maintenance function, a lane departure warning function, a forward collision avoidance function, and a lane change function. In particular, the lane departure warning function and the forward collision avoidance function may actively protect a driver and a passenger from collision with the outside. For example, the lane departure warning function may prevent a collision due to lane departure by steering control, and the forward collision avoidance function may prevent a collision with a front object by deceleration control. Meanwhile, the vehicle may be equipped with an airbag system to protect the driver and the passenger from the impact in the event of a collision.

A user (driver and passenger) of a vehicle may be protected by the driving assistance system for collision avoidance before a collision occurs and may be protected by an airbag system for shock mitigation after the collision occurs. When the driving assistance system is operated for collision avoidance, the position of the user may be greatly changed due to the acceleration that the user does not expect. When the position of the user is greatly changed, the protective effect may be greatly reduced even when the airbag system is operated. That is, the user may not be protected by the airbag system due to the operation of the driving assistance system for collision avoidance.

SUMMARY

The present disclosure has been made to address the above-mentioned problems occurring in the prior art while advantages achieved by the prior art are maintained intact.

An aspect of the present disclosure provides an apparatus and a method for predicting a movement of a user due to operation of a driving assistance system for collision avoidance.

The technical problems to be addressed by the present disclosure are not limited to the aforementioned problems, and any other technical problems not mentioned herein will be clearly understood from the following description by those skilled in the art.

In one aspect of the present disclosure, an apparatus for predicting a movement of a user of a vehicle includes an acceleration sensor that senses an acceleration of the vehicle, a braking controller that automatically controls a deceleration of the vehicle, a steering controller that automatically controls a direction of the vehicle, and a control circuit electrically connected to the acceleration sensor, the braking controller, and the steering controller, wherein the control circuit is configured to monitor an operation of the braking controller, and predict a movement of the user of the vehicle based on a longitudinal acceleration of the vehicle sensed by the acceleration sensor and a first predetermined parameter when braking by the braking controller is detected.

In some implementations, the control circuit may detect the operation of the braking controller by monitoring an operation command signal of the braking controller.

In some implementations, the control circuit may monitor an operation of the steering controller, and predict the movement of the user of the vehicle based on the longitudinal acceleration and a second predetermined parameter when steering by the steering controller is detected before the braking by the braking controller is detected.

In some implementations, the control circuit may detect the operation of the steering controller by monitoring an operation command signal of the steering controller.

In some implementations, the control circuit may predict the movement of the user of the vehicle based on the longitudinal acceleration and a third predetermined parameter when a lateral movement of the user occurs before the braking by the braking controller is detected.

In some implementations, the control circuit may determine whether the lateral movement of the user occurs based on a lateral acceleration of the vehicle.

In some implementations, the control circuit may predict the movement of the user based on a second-order differential equation including the longitudinal acceleration and the first parameter.

In some implementations, the first parameter may be a coefficient of the second-order differential equation.

In some implementations, the control circuit may predict a lateral movement of the user of the vehicle.

In some implementations, the apparatus may further include a safety device, and the control circuit may control the safety device based on a result of the prediction when a collision with a front object occurs.

In another aspect of the present disclosure, a method for predicting a movement of a user of a vehicle includes a control circuit monitoring an operation of a braking controller included in the vehicle, and predicting the movement of the user of the vehicle based on a longitudinal acceleration of the vehicle and a predetermined first parameter when braking by the braking controller is detected.

In some implementations, the method may further include the control circuit monitoring an operation of a steering controller included in the vehicle, and the predicting of the movement of the user may include predicting the movement of the user of the vehicle based on the longitudinal acceleration and a second predetermined parameter when steering by the steering controller is detected before the braking by the braking controller is detected.

In some implementations, the predicting of the movement of the user may include the control circuit predicting the movement of the user of the vehicle based on the longitudinal acceleration and a third predetermined parameter when a lateral movement of the user occurs before the braking by the braking controller is detected.

In some implementations, the predicting of the movement of the user may include the control circuit predicting the movement of the user based on a second differential equation including the longitudinal acceleration and the first parameter.

In some implementations, the method may further include the control circuit controlling a safety device based on a result of the prediction when a collision with a front object occurs.

BRIEF DESCRIPTION OF THE DRAWINGS

In order that the disclosure may be well understood, there will now be described various forms thereof, given by way of example, reference being made to the accompanying drawings, in which.

Figure 1:
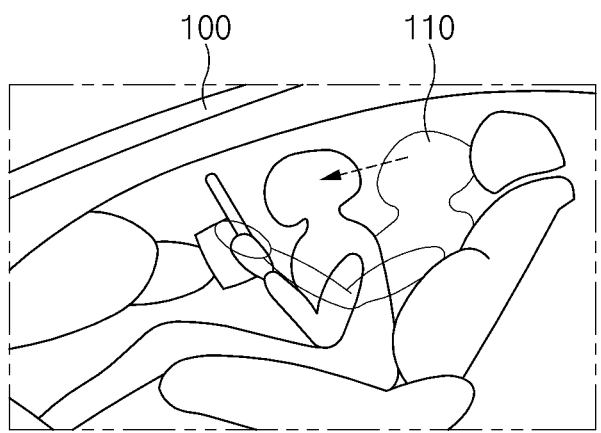
FIG. 1 is a diagram illustrating one form of a user movement predicting apparatus for a vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some embodiments and implementations of the present disclosure will be described in detail with reference to the exemplary drawings. In adding the reference numerals to the components of each drawing, it should be noted that the identical or equivalent component is designated by the identical numeral even when they are displayed on other drawings. Further, in describing embodiments and implementaitons of the present disclosure, a detailed description of well-known features or functions will be ruled out in order not to unnecessarily obscure the gist of the present disclosure.

In describing the components of embodiments and implementations according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a diagram illustrating an operating environment of a user movement predicting apparatus for a vehicle.

Referring to FIG. 1, a driver 110 may drive a vehicle 100. The vehicle 100 may include, for example, an automatic braking controller. When the potential for a forward collision is detected while the driver 110 is driving the vehicle 100, the automatic braking controller of the vehicle 100 may automatically perform deceleration control. When a deceleration control which is unexpected by the driver 110 is performed, the body of the driver 110 may move forward by inertia. When a collision of the vehicle 100 occurs and an airbag system mounted on the vehicle 100 is operated in a state in which the body of the driver 110 has moved, the efficiency of the airbag system may be greatly reduced. In addition, when the collision of the vehicle 100 occurs in the state in which the body of the driver 110 has moved, the efficiency of a seat belt may be greatly reduced. Therefore, when a control unexpected by the driver 110 occurs, it is necessary to predict the movement of the driver 110 and adjust the deployment method of an airbag and the length of the seat belt according to the predicted movement. The vehicle 100 may predict the movement of the driver 110 due to a control before a collision occurs. A detailed operation of the vehicle for predicting the movement of the driver 110 will be described in detail with reference to FIGS. 2 to 7 below.

Figure 2:
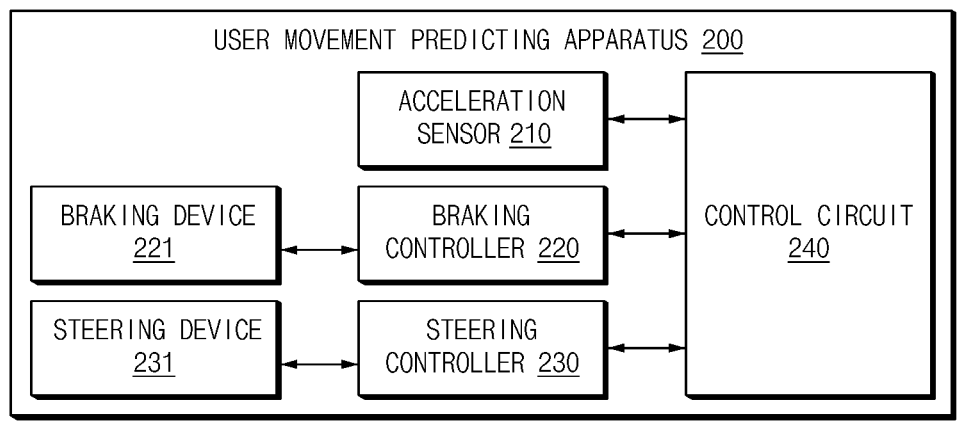
FIG. 2 is a block diagram illustrating one form of a configuration of a user movement predicting apparatus for a vehicle.

FIG. 2 is a block diagram illustrating a configuration of a user movement predicting apparatus for a vehicle.

Referring to FIG. 2, a user movement predicting apparatus 200 may include an acceleration sensor 210, a braking controller 220, a braking device 221, a steering controller 230, a steering device 231, and a control circuit 240. The user movement predicting apparatus 200 may be mounted on a vehicle. In the present disclosure, a user may include a driver and a passenger.

The acceleration sensor 210 may sense an acceleration of the vehicle. The acceleration sensor 210 may sense a longitudinal acceleration and a lateral acceleration of the vehicle. The acceleration sensor 210 may include, for example, an inertial measurement unit (IMU).

The braking controller 220 may automatically control deceleration of the vehicle. The braking controller 220 may automatically control the braking device 221 based on, for example, information obtained by a radar and a camera mounted on the vehicle. For example, the braking controller 220 may perform emergency braking when the potential of a forward collision is detected. The braking device 221 may be manually controlled by the user.

The steering controller 230 may automatically control a direction of the vehicle. The steering controller 230 may automatically control the steering device 231 based on, for example, information obtained by the radar and the camera mounted on the vehicle. For example, the steering controller 230 may perform steering control when a lane departure is detected. The steering device 231 may be manually controlled by the user.

The control circuit 240 may be electrically connected to the acceleration sensor 210, the braking controller 220, and the steering controller 230. The control circuit 240 may control the acceleration sensor 210, the braking controller 220, and the steering controller 230, and may perform various data processing and data operation. The control circuit 240 may be, for example, an electronic control unit (ECU), a micro controller unit (MCU), or a sub-controller mounted on the vehicle.

The control circuit 240 may detect an operation of the braking controller 220, an operation of the steering controller 230, steering control by the driver, or the like.

In some implementations, the control circuit 240 may monitor the operation of the braking controller 220. For example, the control circuit 240 may detect the operation of the braking controller 220 by monitoring an operation command signal of the braking controller 220. The control circuit 240 may monitor the operation command signal through a controller area network (CAN) message. In the present disclosure, the operation of the braking controller 220 may refer to the performance of emergency braking by the braking controller 220 due to the potential of a forward collision.

In some implementations, the control circuit 240 may monitor the operation of the steering controller 230. For example, the control circuit 240 may detect the operation of the steering controller 230 by monitoring an operation command signal of the steering controller 230. The control circuit 240 may monitor the operation command signal through a CAN message.

In some implementations, the control circuit 240 may determine a lateral movement of the user. For example, the control circuit 240 may predict the lateral movement of the user based on a lateral acceleration of the vehicle.

The control circuit 240 may predict the movement of the user based on the operation of the braking controller 220, the operation of the steering controller 230, steering control by the driver, or the like.

In some implementations, when the braking by the braking controller 220 is detected, the control circuit 240 may predict the movement of the user of the vehicle based on the longitudinal acceleration of the vehicle detected by the acceleration sensor 210 and a preset first parameter. When emergency braking is performed by the braking controller 220, the user's body may move forward by inertia. The control circuit 240 may predict the longitudinal movement of the user by using the longitudinal acceleration of the vehicle and the first parameter experimentally derived in an emergency braking situation.

In some implementations, when steering by the steering controller 230 is detected before the braking by the braking controller 220 is detected, the control circuit 240 may predict the movement of the user based on the longitudinal acceleration and a predetermined second parameter. When steering control for lane departure prevention occurs before emergency braking, the movement of the user may become smaller during emergency braking because the user's muscles tense up. Accordingly, the control circuit 240 may predict the longitudinal movement of the user by using the lane departure prevention control and the second parameter experimentally derived in the emergency braking situation.

In some implementations, when a lateral movement of the user occurs before the braking by the braking controller 220 is detected, the control circuit 240 may predict the movement of the user based on the longitudinal acceleration and a predetermined third parameter. When manual steering control is generated by the user (e.g., left turn or right turn at an intersection), the movement of the user may become smaller during emergency braking because the user's muscles tense up. The degree to which the movement of the user becomes smaller by the manual steering control may be different from the degree to which the movement of the user becomes smaller by automatic steering control for lane departure prevention. Accordingly, the control circuit 240 may predict the longitudinal movement of the user using the manual steering control and the third parameter experimentally derived in the emergency braking situation.

In some implementations, the control circuit 240 may predict the movement of the user based on the longitudinal acceleration and a second-order differential equation including the first parameter, the second parameter, or the third parameter. The first parameter, the second parameter or the third parameter may be a coefficient of the second-order differential equation. The movement of the user in the case of emergency braking may be modeled with a spring-damping system. An exemplary equation used by the control circuit 240 may be expressed as follows.

$$\ddot{x} + 2\zeta\omega_n\dot{x} + \omega_n^2 x + a(t) \qquad [\text{Equation 1}]$$

Here, x may be the longitudinal movement distance of the user, a(t) may be the longitudinal acceleration of the vehicle, $\zeta$ and $\omega_n$ may be the first parameter, the second parameter, or the third parameter. The control circuit 240 may appropriately select $\zeta$ and $\omega_n$ according to a collision situation.

In some implementations, the apparatus may further include a safety device, and the control circuit 240 may control the safety device based on a prediction result when the collision with the front object occurs. The safety device may include, for example, a device capable of restraining the user in the vehicle for safety, such as an air bag and a seat belt. For example, the control circuit 240 may adjust the deployment method of an airbag according to the prediction result. In another example, the control circuit 240 may adjust the length of the seat belt according to the prediction result.

Figure 3:
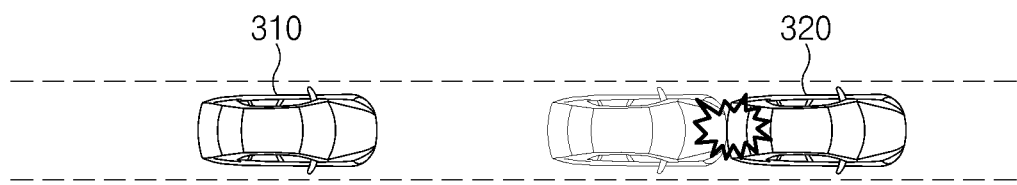
FIG. 3 is a diagram for describing an exemplary operation of a user movement predicting apparatus for a vehicle.

FIG. 3 is a diagram for describing an exemplary operation of a user movement predicting apparatus for a vehicle according to an embodiment of the present disclosure.

Referring to FIG. 3, a vehicle 310 may be driving on a road. The vehicle 310 may detect a front vehicle 320. The vehicle 310 may determine a possibility of a collision between the vehicle 310 and the front vehicle 320 based on the speed and acceleration of the vehicle 310, the speed and acceleration of the front vehicle 320, a distance between the vehicle 310 and the front vehicle 320, or the like. If there is a possibility of a forward collision, the vehicle 310 may perform emergency braking. When the emergency braking which is not intended by the user is performed, the body of the user of the vehicle 310 may be leaned forward. The vehicle 310 may predict the movement of the user due to the emergency braking based on the acceleration of the vehicle 310 and the first parameter derived by experiment. The vehicle 310 may control the safety device using a result of the prediction when the vehicle 310 collides with the front vehicle 320.

Figure 4:
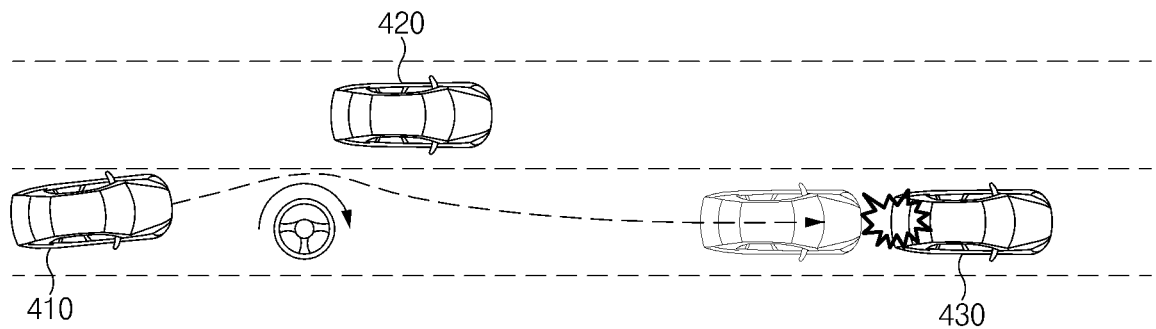
FIG. 4 is a diagram for describing an exemplary operation of a user movement predicting apparatus for a vehicle.

FIG. 4 is a diagram for describing an exemplary operation of a user movement predicting apparatus for a vehicle.

Referring to FIG. 4, a vehicle 410 may be driving on a road. When the vehicle 410 is driving, a direction of the vehicle 410 may be tilted to the left. The vehicle 410 may recognize a lane using a camera, and may perform steering control for lane maintenance based on a result of the recognition. A collision with a side vehicle 420 may be prevented by steering control. When the steering control which is not intended by the user is performed, the user's muscles may tense up. After the steering control, the vehicle 410 may determine a possibility of a collision between the vehicle 410 and a front vehicle 430 based on a speed and acceleration of the vehicle 410, a speed and acceleration of the front vehicle 430, a distance between the vehicle 410 and the front vehicle 430, or the like. When there is a possibility of a forward collision, the vehicle 410 may perform emergency braking. When the emergency braking which is not intended by the user is performed, the body of the user of the vehicle 410 may be leaned forward. The movement of the user in the state in which the muscles tense up may be different from a normal movement. The vehicle 410 may predict the movement of the user due to the emergency braking based on the acceleration of the vehicle 410 and the second parameter experimentally derived. The second parameter may be different from the first parameter. The vehicle 410 may control the safety device using a result of the prediction when the vehicle 410 collides with the front vehicle 430.

Figure 5:
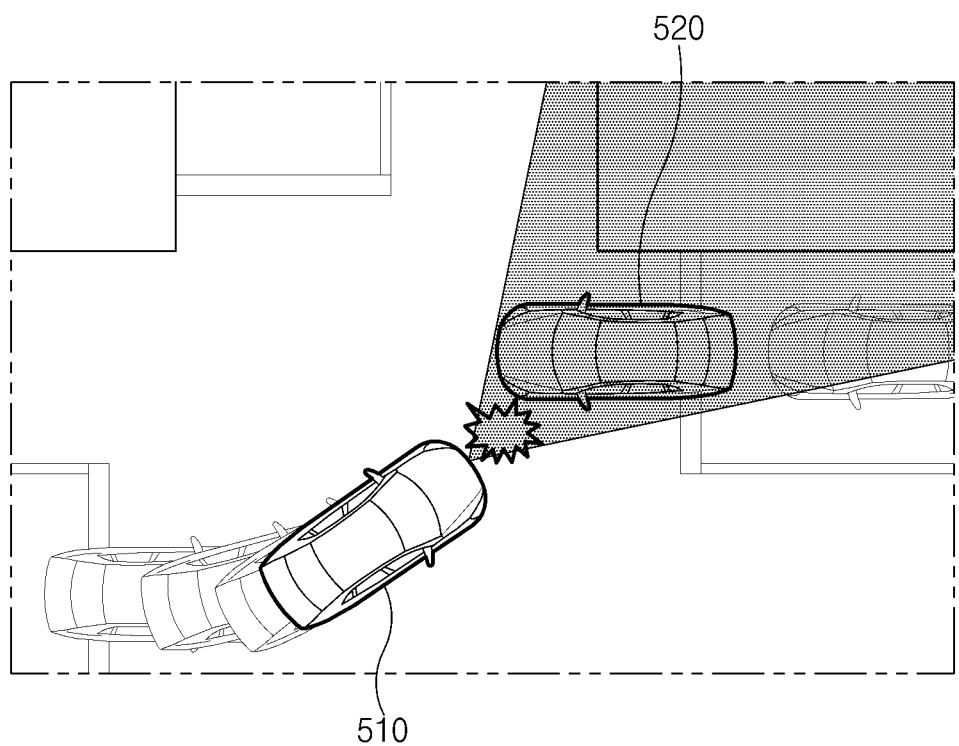
FIG. 5 is a diagram for describing an exemplary operation of a user movement predicting apparatus for a vehicle.

FIG. 5 is a diagram for describing an exemplary operation of a user movement predicting apparatus for a vehicle according to an embodiment of the present disclosure.

Referring to FIG. 5, a vehicle 510 according to an embodiment may be driving on a road. A user of the vehicle 510 may manually perform steering control for a left turn at an intersection. During manual steering control, the vehicle 510 may predict a lateral movement of the user based on a lateral acceleration of the vehicle 510. The lateral movement that exceeds a predetermined reference may strain the user's muscles. During the manual steering control, the vehicle 510 may determine a possibility of a collision between the vehicle 510 and a front vehicle 520 based on a speed and acceleration of the vehicle 510, a speed and acceleration of the front vehicle 520, a distance between the vehicle 510 and the front vehicle 520, or the like. When there is a possibility of a forward collision, the vehicle 510 may perform emergency braking. When the emergency braking which is not intended by the user is performed, the body of the user of the vehicle 510 may be leaned forward. The movement of the user in the state in which the muscles tense up may be different from a normal movement. The vehicle 510 may predict the movement of the user due to the emergency braking based on the acceleration of the vehicle 510 and the third parameter experimentally derived. The third parameter may be different from the first parameter and the second parameter. The vehicle 510 may control the safety device using a result of the prediction when the vehicle 510 collides with the front vehicle 520.

Figure 6:
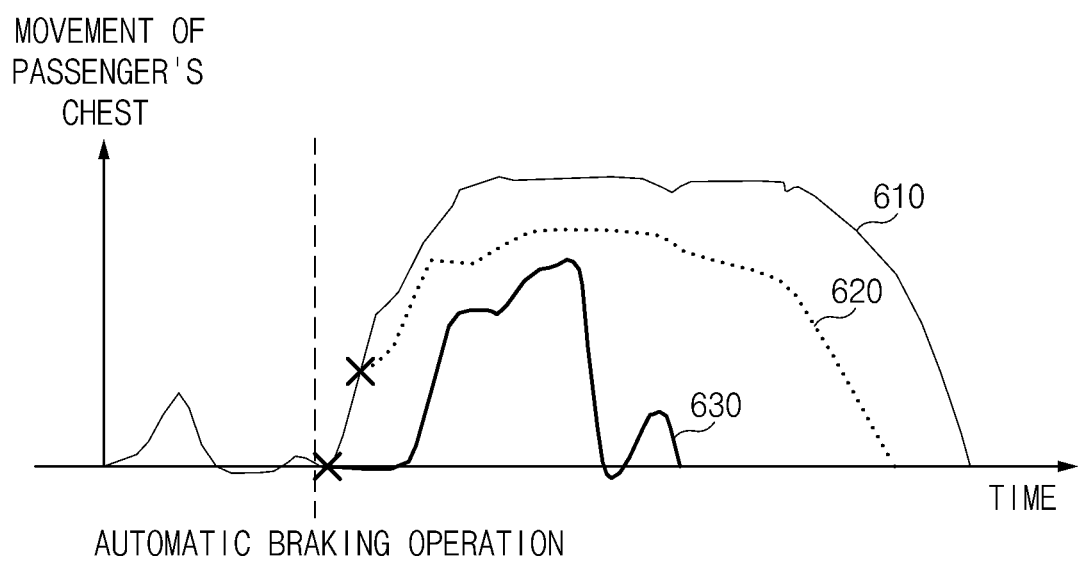
FIG. 6 is a diagram for describing an exemplary operation of a user movement predicting apparatus for a vehicle.

FIG. 6 is a diagram for describing an exemplary operation of a user movement predicting apparatus for a vehicle.

Referring to FIG. 6, a first curve 610 may represent a longitudinal movement of the chest of a passenger (including a driver) over time in the case of an emergency braking operation (first scenario). A second curve 620 may represent a longitudinal movement of the chest of the passenger over time in the case of an emergency braking operation after automatic steering control (second scenario). A third curve 630 may represent a longitudinal movement of the chest of the passenger over time in the case of an emergency braking operation after manual steering control (third scenario). Referring to the first curve 610, the second curve 620, and the third curve 630, the movement of the passenger according to the second scenario is smaller than that of the passenger according to the first scenario, and the movement of the passenger according to the third scenario is smaller than that of the passenger according to the first scenario. A first parameter, a second parameter, and a third parameter respectively corresponding to the first scenario, the second scenario, and the third scenario may be determined according to the movements of the passenger, as shown in the first curve 610, the second curve 620, and the third curve 630.

Figure 7:
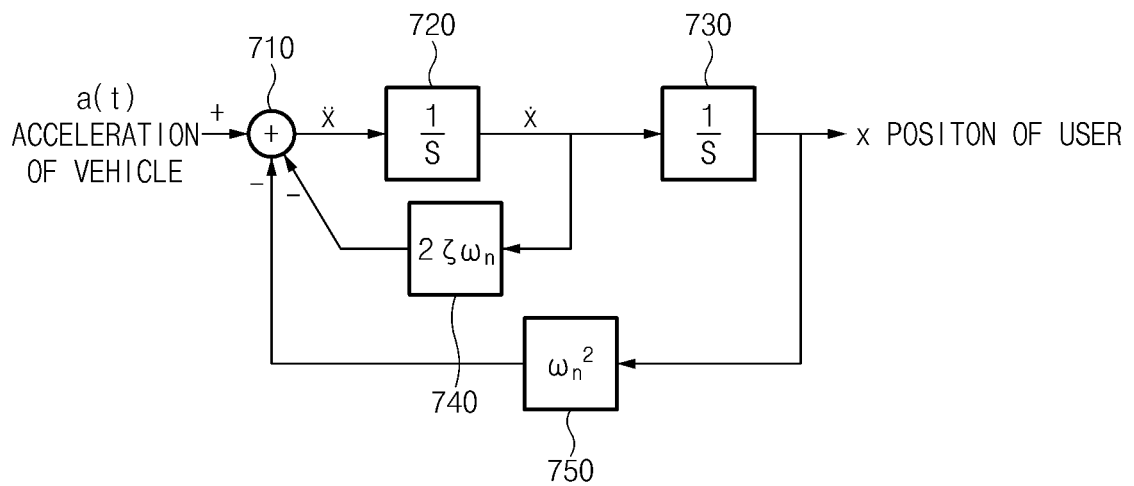
FIG. 7 is a diagram for describing an exemplary operation of a user movement predicting apparatus for a vehicle.

FIG. 7 is a diagram for describing an exemplary operation of a user movement predicting apparatus for a vehicle.

Referring to FIG. 7, a vehicle may predict a position x of a user using an adder 710, integrators 720 and 730, and inverting amplifiers 740 and 750. The parameters $\zeta$ and $\omega_n$ associated with gains of the inverting amplifiers 740 and 750 may be determined according to a scenario. A longitudinal acceleration a(t) of the vehicle may be provided as an input to the adder 710. The adder 710 may output a longitudinal acceleration x" of the user, and the integrator 720 may output a longitudinal speed x' of the user. The longitudinal speed x' of the user may be fed back to the adder 710 through the inverting amplifier 740 (gain=$-2\zeta\omega_n$). The integrator 730 may output the position x of the user. The position x of the user may be fed back to the adder 710 through the inverting amplifier 750 (gain=$-\omega_n^2$). Thus, the movement of the user may be predicted in the case of emergency braking.

Figure 8:
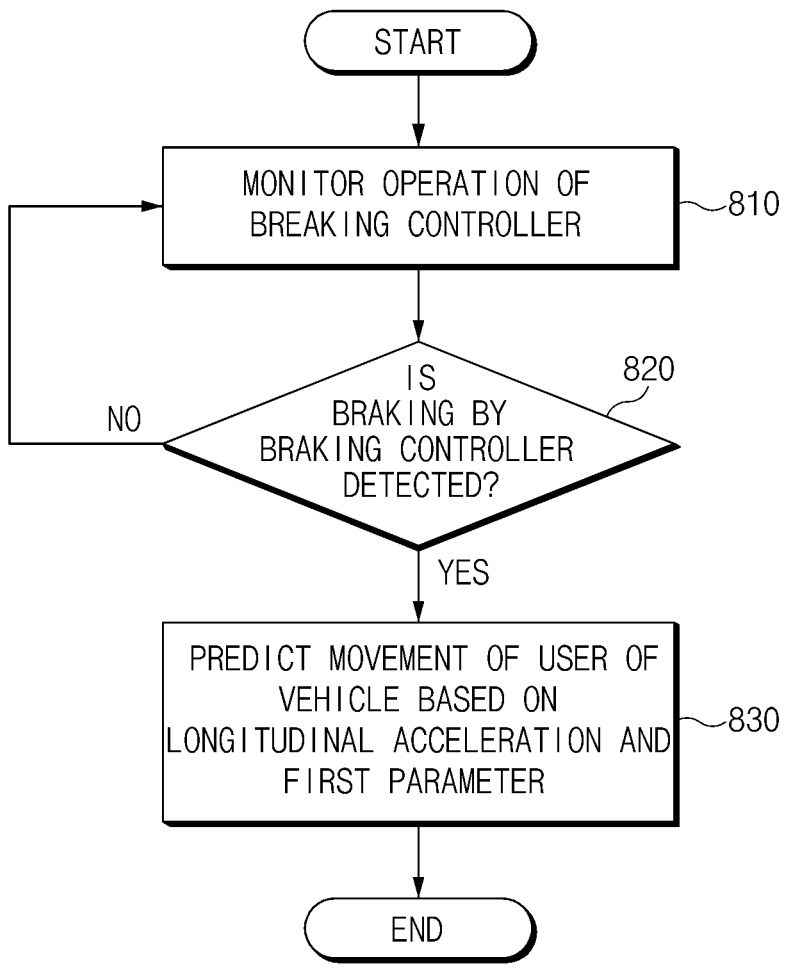
FIG. 8 is a flowchart for describing one form of a user movement predicting method for a vehicle.

FIG. 8 is a flowchart for describing one form of a user movement predicting method for a vehicle.

Hereinafter, it is assumed that a vehicle including the user movement predicting apparatus 200 of FIG. 2 performs the process of FIG. 8. In addition, in the description with reference to FIG. 8, it may be understood that the operations described as being performed by the vehicle are controlled by the control circuit 240 of the user movement predicting apparatus 200.

Referring to FIG. 8, a vehicle may monitor an operation of the braking controller in operation 810. For example, the vehicle may monitor an operation command signal through a CAN message of a braking controller.

In operation 820, the vehicle may determine whether braking by the braking controller is detected. For example, the vehicle may determine whether emergency braking is performed by the braking controller.

When emergency braking is detected, the vehicle may predict a movement of a user of the vehicle based on a longitudinal acceleration of the vehicle and the first parameter in operation 830. For example, the vehicle may predict a forward movement of the user of the vehicle due to the emergency braking. A result of the prediction may be referred to for control of a safety device, thus improving the safety of the user.

Figure 9:
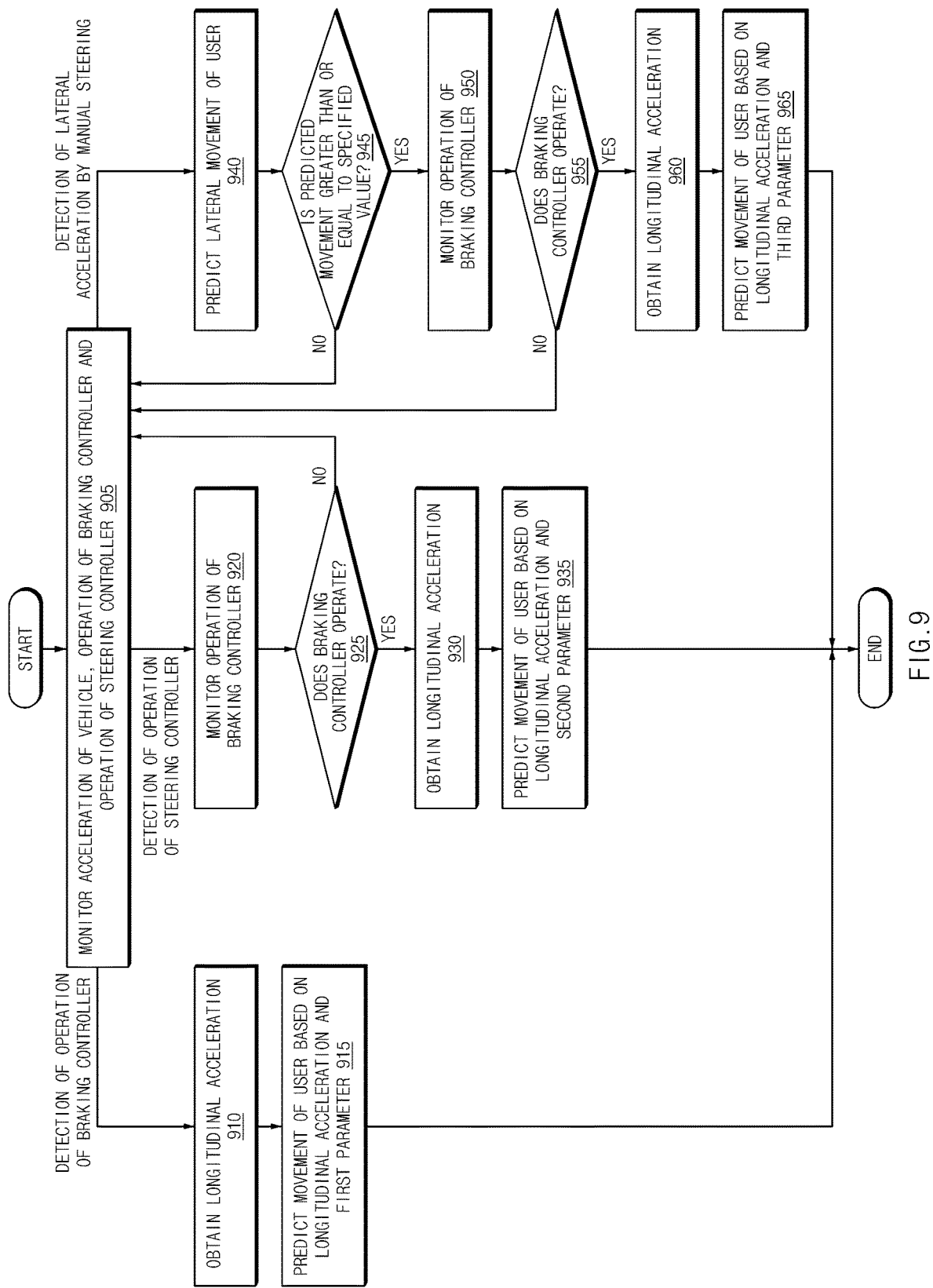
FIG. 9 is a flowchart for describing one form of a user movement predicting method for a vehicle.

FIG. 9 is a flowchart for describing a user movement predicting method for a vehicle.

Hereinafter, it is assumed that a vehicle including the user movement predicting apparatus 200 of FIG. 2 performs the process of FIG. 9. In addition, in the description with reference to FIG. 9, it may be understood that the operations described as being performed by the vehicle are controlled by the control circuit 240 of the user movement predicting apparatus 200.

In operation 905, the vehicle may monitor an acceleration of the vehicle, an operation of a braking controller, and an operation of a steering controller.

When the operation of the braking controller is detected, the vehicle may obtain a longitudinal acceleration of the vehicle in operation 910. In operation 915, the vehicle may predict a movement of the user based on the longitudinal acceleration and the first parameter.

When the operation of the steering controller is detected, the vehicle may monitor the operation of the braking controller in operation 920. In operation 925, the vehicle may determine whether the braking controller is operating. When the operation of the braking controller is detected, the vehicle may obtain a longitudinal acceleration of the vehicle in operation 930. In operation 935, the vehicle may predict the movement of the user based on the longitudinal acceleration and the second parameter. When the braking controller does not operate within a designated period of time, operation 905 may be performed again.

When a lateral acceleration due to manual steering is detected, the vehicle may predict a lateral movement of the user in operation 940. In operation 945, the vehicle may determine whether the predicted movement is greater than or equal to a specified value. When the predicted movement is greater than or equal to the specified value, the vehicle may monitor an operation of the braking controller in operation 950. In operation 955, the vehicle may determine whether the braking controller is operating. When the operation of the braking controller is detected, the vehicle may obtain a longitudinal acceleration of the vehicle in operation 960. In operation 965, the vehicle may predict the movement of the user based on the longitudinal acceleration and a third parameter. When the predicted movement is less than the specified value or the braking controller does not operate within the specified period of time, operation 905 may be performed again.

Figure 10:
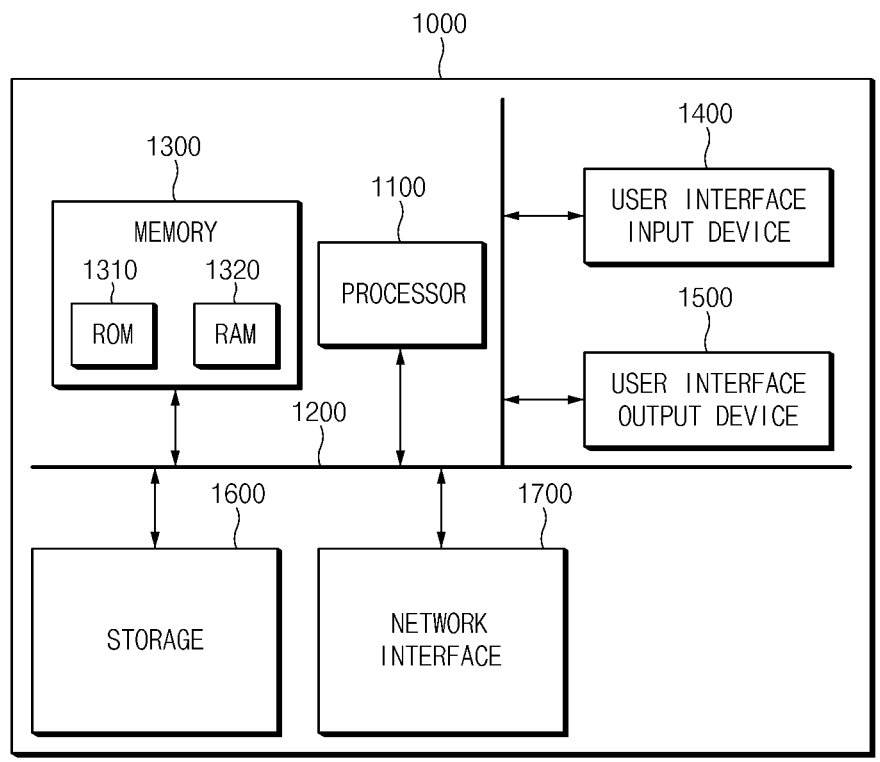
FIG. 10 illustrates one form of a computing system.

FIG. 10 illustrates a computing system. Referring to FIG. 10, implementations of the method according to the present disclosure described above may be implemented through a computing system. A computing system 1000 may include at least one processor 1100, a memory 1300, a user interface input device 1400, a user interface output device 1500, storage 1600, and a network interface 1700, which are connected with each other via a system bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor and the storage medium may reside in the user terminal as separate components.

According to the present disclosure, it is possible to improve the user protection effect of an in-vehicle safety device such as an airbag system or a seat belt when a collision occurs by predicting a user's movement according to operation of a braking controller, a steering controller, or the like for collision avoidance.

In addition, various effects may be provided that are directly or indirectly understood through the disclosure.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An apparatus for predicting a movement of a user of a vehicle, the apparatus comprising:
   an acceleration sensor configured to sense an acceleration of the vehicle;
   a braking controller configured to automatically control a deceleration of the vehicle;
   a steering controller configured to automatically control a direction of the vehicle;
   a steering device configured to be controlled by the steering controller or manually;
   a safety device capable of restraining the user in the vehicle; and
   a control circuit electrically connected to the acceleration sensor, the braking controller, the steering controller and the safety device,
   wherein the control circuit is configured to:
      monitor an operation of the braking controller and the steering device;
      select one from a first predetermined parameter, a second predetermined parameter and a third predetermined parameter based on operation of the braking controller and the steering device;
      predict a movement of the user of the vehicle differently based on the selected parameter from the first predetermined parameter, the second predetermined parameter and the third predetermined parameter;
      predict the movement of the user of the vehicle based on a longitudinal acceleration of the vehicle sensed by the acceleration sensor and the first predetermined parameter when braking by the braking controller is detected and an operation of the steering device is not detected; and
      adjust a control process of the safety device or a control amount of the safety device differently based on a result of the prediction based on the movement of the user.

2. The apparatus of claim 1, wherein the control circuit is further configured to detect an operation of the braking controller by monitoring an operation command signal of the braking controller.

3. The apparatus of claim 1, wherein the control circuit is further configured to:
   monitor an operation of the steering controller, and
   predict the movement of the user of the vehicle based on the longitudinal acceleration and the second predetermined parameter when steering by the steering controller is detected before the braking by the braking controller is detected.

4. The apparatus of claim 3, wherein the control circuit is further configured to detect the operation of the steering controller by monitoring an operation command signal of the steering controller.

5. The apparatus of claim 1, wherein the control circuit is further configured to predict the movement of the user of the vehicle based on the longitudinal acceleration and the third predetermined parameter when a lateral movement of the user occurs before the braking by the braking controller is detected.

6. The apparatus of claim 5, wherein the control circuit is further configured to determine whether the lateral movement of the user occurs based on a lateral acceleration of the vehicle.

7. The apparatus of claim 1, wherein the control circuit is further configured to predict the movement of the user based on a second-order differential equation including the longitudinal acceleration and the first predetermined parameter.

8. The apparatus of claim 7, wherein the first predetermined parameter is a coefficient of the second-order differential equation.

9. The apparatus of claim 1, wherein the control circuit is further configured to predict a lateral movement of the user of the vehicle.

10. A method for predicting a movement of a user of a vehicle, the method comprising:
monitoring, by a control circuit, an operation of a braking controller and a steering device included in the vehicle;
selecting, with a control circuit, one from a first predetermined parameter, a second predetermined parameter and a third predetermined parameter based on operation of the braking controller and the steering device;
predicting, with a control circuit, a movement of the user of the vehicle differently based on the selected parameter from the first predetermined parameter, the second predetermined parameter and the third predetermined parameter;
predicting, by the control circuit, the movement of the user of the vehicle based on a longitudinal acceleration of the vehicle and the first predetermined parameter when braking by the braking controller is detected and an operation of the steering device is not detected; and
adjusting, by the control circuit, a control process of a safety device or a control amount of the safety device differently capable of restraining the user in the vehicle based on the movement of the user.

11. The method of claim 10, further comprising:
monitoring an operation of a steering controller included in the vehicle,
wherein the predicting of the movement of the user includes predicting, with the control circuit, the movement of the user of the vehicle based on the longitudinal acceleration and the second predetermined parameter when steering by the steering controller is detected before the braking by the braking controller is detected.

12. The method of claim 10, wherein the predicting of the movement of the user includes predicting, with the control circuit, the movement of the user of the vehicle based on the longitudinal acceleration and the third predetermined parameter when a lateral movement of the user occurs before the braking by the braking controller is detected.

13. The method of claim 10, wherein the predicting of the movement of the user includes predicting, with the control circuit, the movement of the user based on a second differential equation including the longitudinal acceleration and the first predetermined parameter.

14. An apparatus for predicting movement of a user of a vehicle, the apparatus comprising:
an acceleration sensor configured to sense an acceleration of the vehicle;
a braking controller configured to automatically control a deceleration of the vehicle;
a steering controller configured to automatically control a direction of the vehicle;
a steering device configured to be controlled by the steering controller or manually;
a safety device capable of restraining the user in the vehicle; and
a control circuit electrically connected to the acceleration sensor, the braking controller, and the steering controller, wherein the control circuit is configured to:
monitor an operation of the braking controller and a steering device,
select one from a first predetermined parameter, a second predetermined parameter and a third predetermined parameter based on operation of the braking controller and the steering device,
predict a movement of the user of the vehicle differently based on the selected parameter from the first predetermined parameter, the second predetermined parameter and the third predetermined parameter, and
adjust a control process of the safety device or a control amount of the safety device differently based on a result of the prediction based on the movement of the user.

15. A method for predicting a movement of a user of a vehicle, the method comprising:
monitoring, with a control circuit, an operation of a braking controller and a steering device included in the vehicle;
selecting, with the control circuit, one from a first predetermined parameter, a second predetermined parameter and a third predetermined parameter based on operation of the braking controller and the steering device,
predicting, with the control circuit, a movement of the user of the vehicle differently based on the selected parameter from the first predetermined parameter, the second predetermined parameter and the third predetermined parameter, and
adjusting a control process of a safety device or a control amount of the safety device differently capable of restraining the user in the vehicle based on the movement of the user.

* * * * *